United States Patent
Miklós et al.

(10) Patent No.: US 9,439,236 B2
(45) Date of Patent: Sep. 6, 2016

(54) TELECOMMUNICATION SYSTEMS WITH DISCONTINUOUS RECEPTION

(75) Inventors: György Miklós, Pilisborosjenö (HU); Joachim Sachs, Sollentuna (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 18 days.

(21) Appl. No.: 14/398,699

(22) PCT Filed: May 3, 2012

(86) PCT No.: PCT/EP2012/058099
§ 371 (c)(1),
(2), (4) Date: Nov. 3, 2014

(87) PCT Pub. No.: WO2013/164025
PCT Pub. Date: Nov. 7, 2013

(65) Prior Publication Data
US 2015/0109979 A1    Apr. 23, 2015

(51) Int. Cl.
*H04W 76/04*    (2009.01)
*H04W 36/36*    (2009.01)

(52) U.S. Cl.
CPC ........... *H04W 76/048* (2013.01); *H04W 36/36* (2013.01)

(58) Field of Classification Search
None
See application file for complete search history.

(56) References Cited

U.S. PATENT DOCUMENTS

| 6,377,803 | B1 | 4/2002 | Ruohonen | |
|---|---|---|---|---|
| 2011/0269462 | A1 | 11/2011 | Sägfors et al. | |
| 2011/0292851 | A1* | 12/2011 | Fong | H04L 5/001 370/311 |
| 2012/0026903 | A1* | 2/2012 | Song | H04W 72/04 370/252 |

FOREIGN PATENT DOCUMENTS

| WO | 2010147956 | * 12/2010 |
|---|---|---|
| WO | 2010147956 A2 | 12/2010 |

OTHER PUBLICATIONS

Panasonic (Email Rapporteur) "Summary of email discussion on DRX in LTE_ACTIVE" 3GPP TSG RAN WG2 #56bis, R2-070088, 2007, 9 pages.

* cited by examiner

*Primary Examiner* — Gary Mui
(74) *Attorney, Agent, or Firm* — Rothwell, Figg, Ernst & Manbeck, P.C.

(57) ABSTRACT

A method aims at controlling parameters used by communication terminals of a telecommunication system which enables discontinuous reception. The discontinuous reception involves DRX cycles during each one of which a communication terminal wakes up at least once to monitor a downlink control channel. The telecommunication system enables the use of DRX cycles of different lengths. The method includes a determining procedure (s10) comprising determining, on a per communication terminal basis, whether the communication terminal is eligible to rely on a terminal-controlled mobility procedure, wherein determining is based on at least one characteristic of the communication terminal. The method also includes a setting procedure (s20) comprising, at least for one of the possible outcomes of the determining procedure (s10), setting one or more parameters on the communication terminal accordingly.

26 Claims, 9 Drawing Sheets

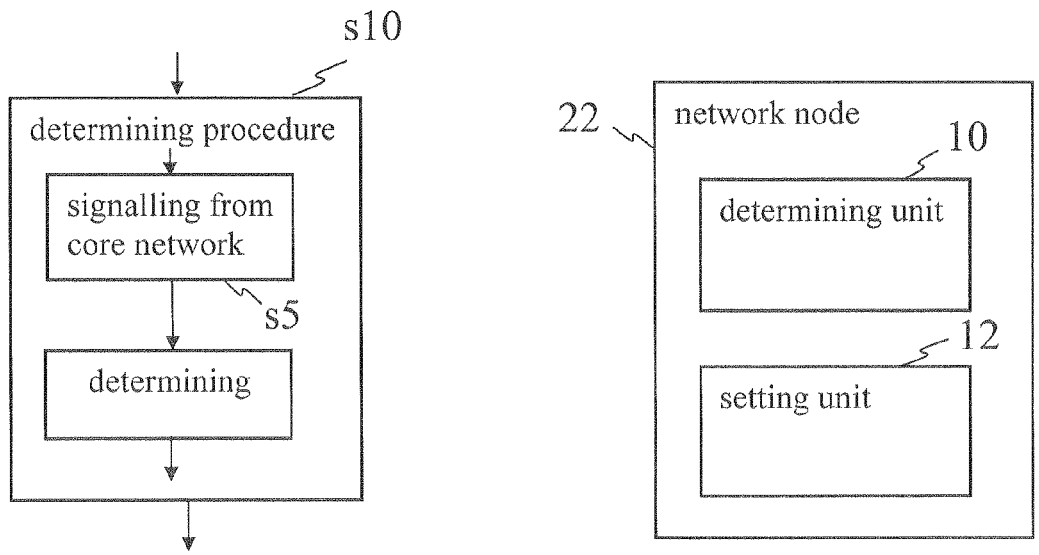
Fig. 6
Fig. 9
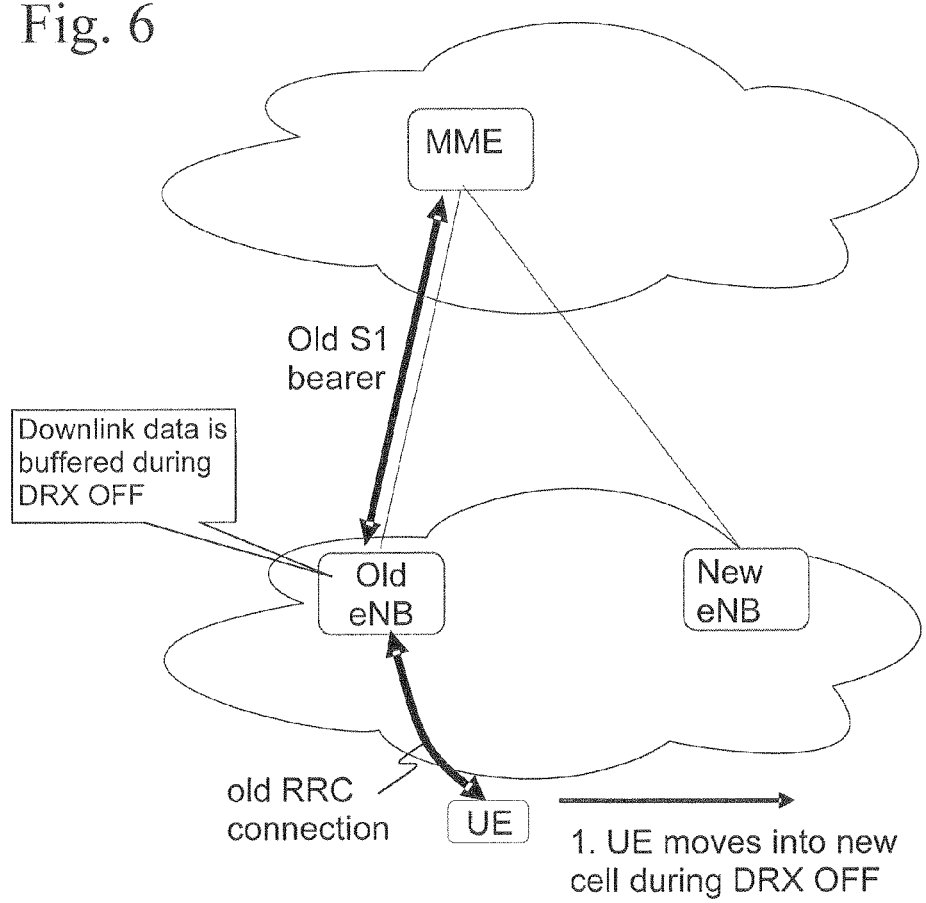
Fig. 10a

TELECOMMUNICATION SYSTEMS WITH DISCONTINUOUS RECEPTION

CROSS REFERENCE TO RELATED APPLICATION(S)

This application is a 35 U.S.C. §371 National Phase Entry Application from PCT/EP2012/058099, filed May 3, 2012, designating the United States, the disclosure of which is incorporated herein in its entirety by reference.

TECHNICAL FIELD

The present invention relates to methods involving discontinuous reception (DRX) in telecommunication systems. The invention also relates to network nodes, as well as to computer program products and computer programs comprising computer-executable instructions configured, when executed on a computer, to cause the computer to carry out a method as mentioned above.

BACKGROUND

Discontinuous reception (DRX) is a known technique in telecommunications, which is used to reduce the power consumption of user terminals. Discontinuous reception may be used in different situations, such as for instance in a radio resource control (RRC) idle state or in a RRC connected state. During discontinuous reception in RRC connected state, a user terminal stops monitoring one or more signalling channels (layers 1 and 2) but a RRC connection (layer 3) is generally still maintained for the user terminal during that time.

FIG. 1 schematically illustrates an exemplary DRX cycle as disclosed in "3*GPP TS* 36.321 *V*10.4.0 (2011-12), *Technical Specification,* 3*rd Generation Partnership Project; Technical Specification Group Radio Access Network; Evolved Universal Terrestrial Radio Access (E-UTRA); Medium Access Control (MAC) protocol specification (Release* 10)", page 7. When the DRX functionality is configured, a user equipment (UE) is allowed to monitor a downlink control channel discontinuously, such as for example a physical downlink control channel (PDCCH) as defined in "3*GPP TS* 36.211 *V*10.4.0 (2011-12), *Technical Specification,* 3*rd Generation Partnership Project; Technical Specification Group Radio Access Network; Evolved Universal Terrestrial Radio Access (E-UTRA); Physical Channels and Modulation (Release* 10)".

In particular, "3*GPP TS* 36.300 *V*10.6.0 (2011-12), *Technical Specification,* 3*rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage* 2 (*Release* 10)" discloses, in its section 12 entitled "DRX in RRC_CONNECTED", characteristics of a known, exemplary DRX functionality.

It is desirable to improve existing telecommunication systems with discontinuous reception without increasing, or at least without excessively increasing, the implementation and architecture complexity and the associated equipment costs.

SUMMARY

To meet or at least partially meet the above-mentioned goals, methods, network nodes, computer programs, computer program products and storage mediums according to the invention are defined in the independent claims. Advantageous embodiments are defined in the dependent claims.

In one embodiment, a method is carried out by a network node, for controlling parameters used by communication terminals of a telecommunication system. The telecommunication system enables the use of discontinuous reception by communication terminals. The use of discontinuous reception by a communication terminal involves cycles, here referred to as "DRX cycles", during each one of which a communication terminal is arranged to wake up at least once to monitor a downlink control channel. The telecommunication system enables the use of DRX cycles of different lengths. The method includes a first procedure, here referred to as "determining procedure", comprising determining, on a per communication terminal basis, whether the communication terminal is eligible to rely on a terminal-controlled mobility procedure, wherein determining is based on at least one characteristic of the communication terminal. The method also includes a second procedure, here referred to as "setting procedure", comprising, at least for one of the possible outcomes of the determining procedure, setting one or more parameters on the communication terminal accordingly.

The method enables to take into account the characteristics of individual communication terminals when controlling the parameters that these communication terminals use, so as to reduce the risk of potentially disruptive terminal-controlled mobility procedures. It has been notably recognized that, when some communication terminals are allowed to operate with a large DRX cycle, they may move into a new cell during a DRX inactivity period, thus preventing the network from centrally and efficiently managing the network resources. It has been also observed that the problem tends to arise more often when the length of the DRX cycle is unusually long, such as longer than 2.56 seconds.

This may be explained as follows. With increasing DRX cycle values, the period at which communication terminals perform measurements of the signal power from their serving cell and neighbouring cells also increases. As a consequence, the probability increases that the channel quality decreases so much between two consecutive measurements that a communication terminal is no longer able to send a measurement report or receive a handover command from the network. In such a case, the network may no longer be able to prepare a new serving cell for this communication terminal and to instruct the communication terminal to perform the handover to such new cell. Consequently, the anticipated network-controlled mobility fails. In order to recover from this radio link failure, the communication terminal may be, after generally waiting for a period of time, allowed to attempt to find a suitable cell by itself and to perform a connection re-establishment. This mode of operation is referred to as terminal-controlled mobility procedure. If the chosen cell has or can obtain the communication terminal's context from the source cell, the re-establishment may be successful. While the performance (latency; interruption time; . . . ) may be worse than for network-controlled mobility, the successful re-establishment may still be acceptable for certain applications. On the other hand, the benefit of using very long DRX cycles is that it reduces the communication terminal's power consumption. The proposed mechanism therefore offers a trade-off between this reduction in power consumption and the possible impact on the performance due to relying on terminal-controlled mobility procedures.

It has been further recognized that the method is particularly advantageous notably when some communication terminals in the telecommunication system are autonomous devices, machine-to-machine terminals, actuators, sensors, or the like. These types of communication terminals are very power-sensitive, their power consumption should be reduced, and the use of long or very long DRX cycles may be often envisaged for them.

In the present context, a network node may be for instance a base transceiver station (BTS), a base station controller (BSC), a radio network controller (RNC), a Node B, or an eNodeB (eNB).

Controlling parameters used by communication terminals means setting, in the telecommunication system, parameters for advising, recommending or instructing a communication terminal to behave in a specific manner. Generally, the parameters provided to the communication terminal are binding.

A communication terminal may be, without being limited to, a mobile phone, a smart phone, a personal digital assistant (PDA), a tablet computer, a laptop, a handheld computer, a handheld gaming device, a media player (such as a MP3 player), a sensor, or an actuator. A communication terminal is also referred to herewith as user equipment (UE), although the communication terminal may not necessarily be associated with a user. The downlink control channel may be, without being limited to, a PDCCH.

The setting procedure may comprise a setting operation performed on a per communication terminal basis, as a result of the determining procedure performed on a per communication terminal basis. This means that the network node causes the setting information to be stored for each communication terminal individually. The setting information may therefore be, at one point in time, different amongst the communication terminals operating within the same telecommunication system.

A terminal-controlled mobility procedure is a procedure during which a communication terminal hands over to, or reselects, another cell without an explicit command from the network.

The invention also relates to a network node configured for carrying out the above-mentioned method.

The invention also relates to computer program products and computer programs comprising computer-executable instructions configured, when executed on a network node or a computer, to cause the network node or computer to carry out a method according to any one of the above-described embodiments.

BRIEF DESCRIPTION OF THE DRAWINGS

Embodiments of the present invention shall now be described, in conjunction with the appended figures, in which:

FIG. 6, on page "6/9" of the drawings, is a flowchart of a method in one embodiment of the invention, wherein, in the determining procedure, the determining operation is triggered by signalling from the core network;

FIG. 9 schematically illustrates a functional configuration of a network node in one embodiment of the invention;

FIGS. 10a to 10c are schematic diagrams illustrating exemplary problems that some embodiments of the invention may address.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
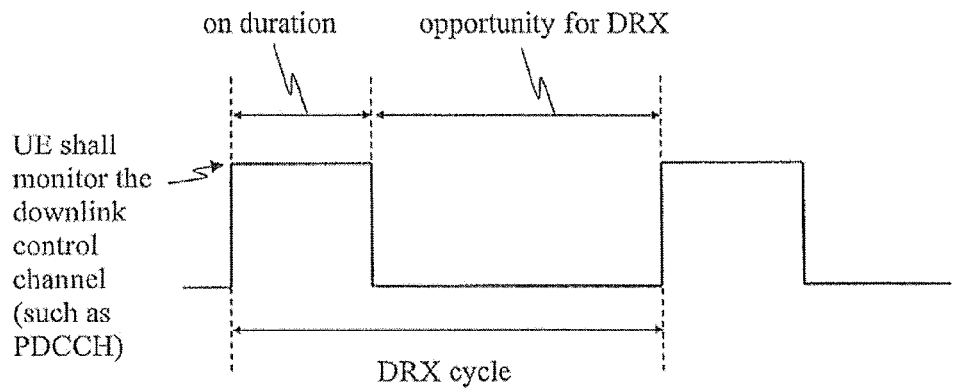
FIG. 1 schematically illustrates an exemplary, conventional DRX cycle.
Figure 2A:
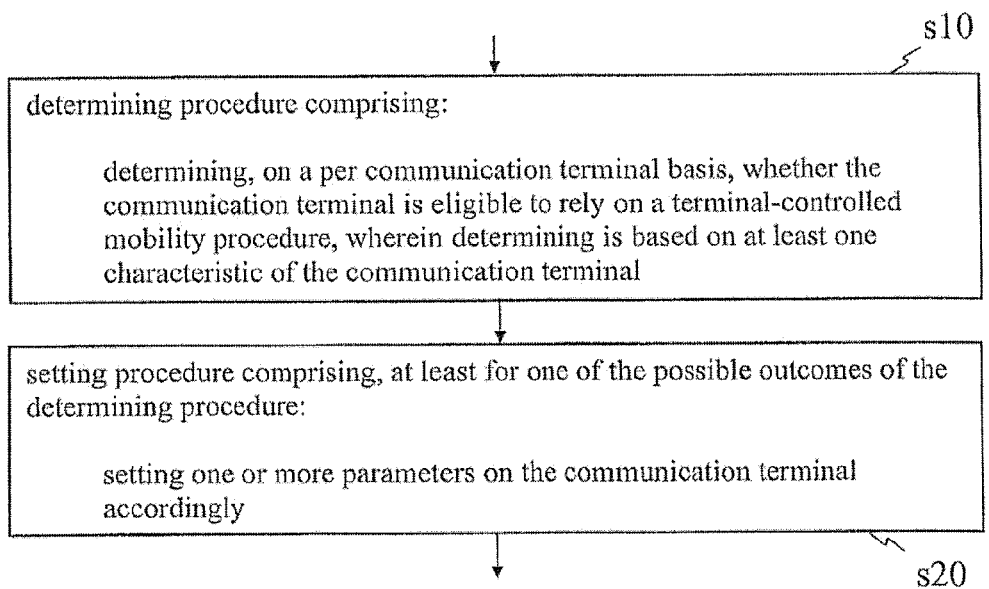
FIGS. 2a to 2d are flowcharts of methods in embodiments of the invention.

FIG. 2a is a flowchart of a method in one embodiment of the invention. The method is carried out by a network node, for controlling parameters used by communication terminals of a telecommunication system, wherein the telecommunication system enables the use of discontinuous reception by communication terminals. In particular, the telecommunication system enables the use of DRX cycles of different lengths. The method includes a determining procedure s10, which comprises determining, on a per communication terminal basis, whether the communication terminal is eligible to rely on a terminal-controlled mobility procedure. The determining operation is based on at least one characteristic of the communication terminal. The method also includes a setting procedure s20 comprising, at least for one of the possible outcomes of the determining procedure s10, setting one or more parameters on the communication terminal to reflect the outcome of the determination made by the network node.

In the determining procedure s10, the network node therefore determines whether a communication terminal is eligible to rely on a terminal-controlled mobility procedure. The eligibility determination may aim at reducing the occurrences of disrupting terminal-controlled mobility procedures. This determination may take into account whether the fact that a communication terminal would rely on a terminal-controlled mobility procedure would be beneficial for the communication terminal itself and for the telecommunication system as a whole.

Figure 2B:
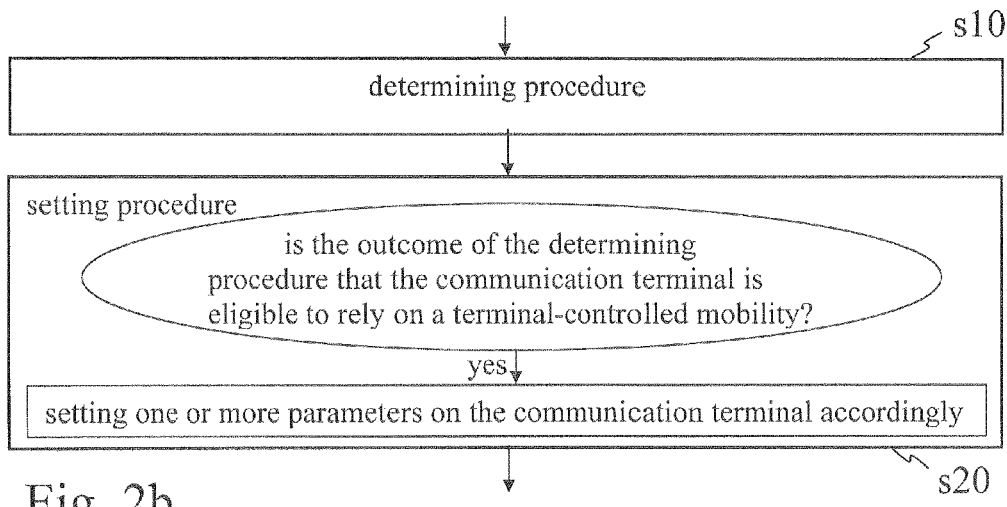
Figure 2C:
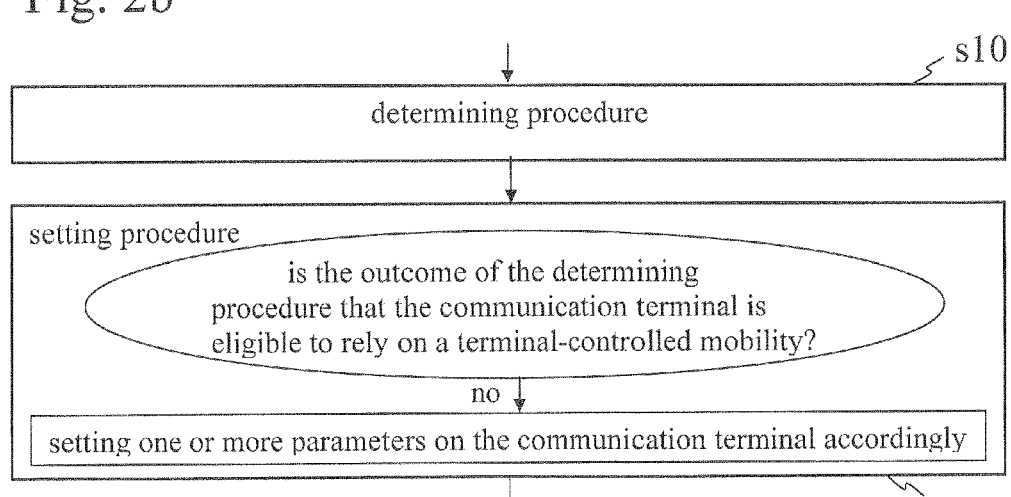
Figure 2D:
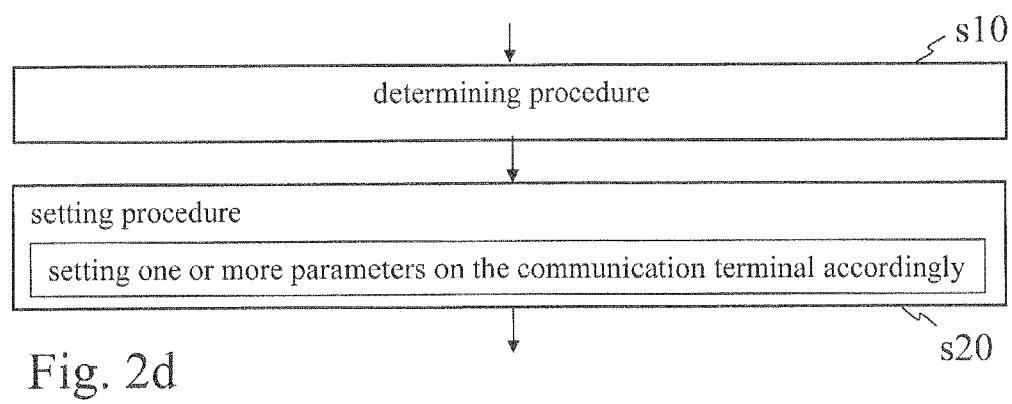

In the definition of the setting procedure s20, the use of words "at least for one of the possible outcomes of the determining procedure s10" covers embodiments of a setting procedure s20 encompassing the cases (i) where the network node only sets parameter(s) on the communication terminal to reflect the network node determination that the communication terminal is eligible to rely on a terminal-controlled mobility procedure (as illustrated by FIG. 2b), (ii) where the network node only sets parameter(s) on the communication terminal to reflect the network node determination that the communication terminal is not eligible to rely on a terminal-controlled mobility procedure (as illustrated by FIG. 2c), and (iii) where the network node sets parameter(s) on the communication terminal to reflect a determination that the communication terminal is eligible to rely on a terminal-controlled mobility procedure and the network node also does so when the determination is that the communication terminal is not eligible to rely on a terminal-controlled mobility procedure (as illustrated by FIG. 2d). In case (iii) (as illustrated by FIG. 2d), the parameter(s) set on the communication terminal differ depending on whether the communication terminal is determined to be eligible to rely on a terminal-controlled mobility procedure or not. The determination made by the network node thus has an impact on the communication terminal configuration.

FIGS. 2a-2d show that the setting procedure s20 is carried out by the network node for controlling one or more parameters of the communication terminals. Different parameters may be set, such as for instance as illustrated by the flowcharts of FIGS. 3a to 3d.

Figure 3A:
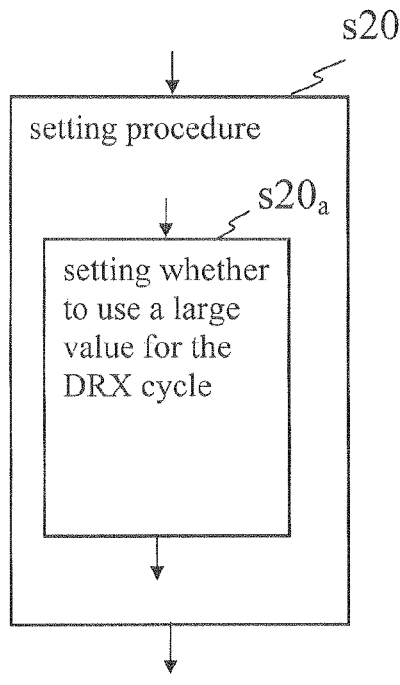
FIGS. 3a to 3d are flowcharts of setting procedures of methods in embodiments of the invention.

FIG. 3a is a flowchart of a setting procedure s20 in a method in one embodiment of the invention wherein the setting procedure s20 comprises setting s20$_a$, on a per communication terminal basis, whether to use a large value for the DRX cycle depending on the determination s10 made by the network node (the determination procedure s10 is not illustrated on FIG. 3a for the sake of conciseness). In this embodiment, the telecommunication system enables at least the use of a DRX cycle with a first length and the use of a DRX cycle with a second length, wherein the first length is shorter than the second length, and the second length may therefore be referred to as "large value". Especially, the setting procedure s20 may consist in allowing the use of a large value for the DRX cycle for a communication terminal if it has been determined that the communication terminal is eligible to rely on a terminal-controlled mobility procedure (i.e., to recover, if necessary, from a loss of serving cell after a DRX inactivity period).

Figure 3B:
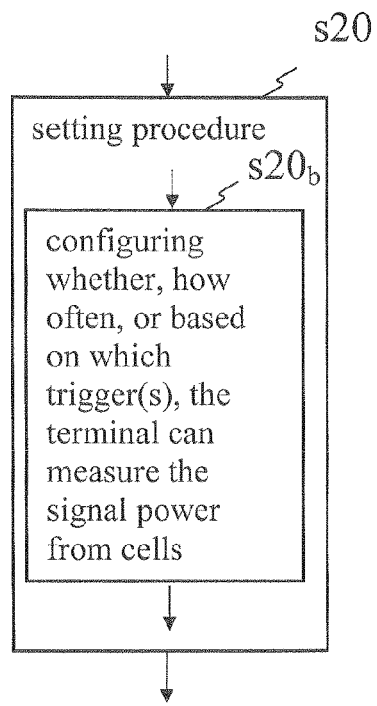

FIG. 3b is a flowchart of a setting procedure s20 in a method in one embodiment of the invention wherein the setting procedure s20 comprises setting s20$_b$, on a per communication terminal basis, whether, how often, or based on which trigger(s), the communication terminal is supposed to, i.e. is instructed, required or allowed to, measure the signal power from its serving cell and neighbouring cells, depending on the determination s10 made by the network node (the determination procedure s10 is not illustrated on FIG. 3b for the sake of conciseness).

Figure 3C:
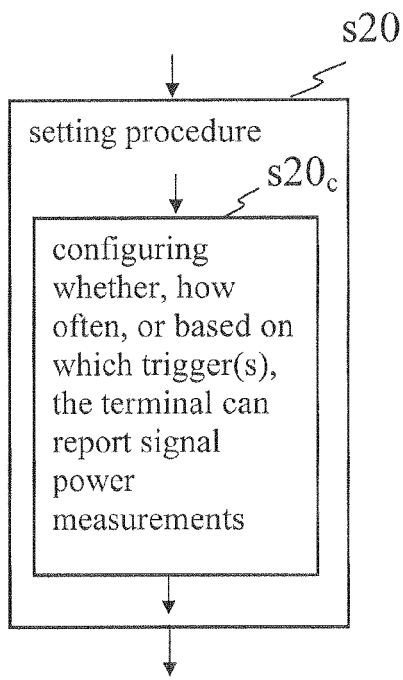

FIG. 3c is a flowchart of a setting procedure s20 in a method in one embodiment of the invention wherein the setting procedure s20 comprises setting s20$_c$, on a per communication terminal basis, whether, or how often, the communication terminal is supposed to, i.e. is instructed or allowed to, report measurements of signal power from its serving cell and neighbouring cells, depending on the determination s10 made by the network node (the determination procedure s10 is not illustrated on FIG. 3c for the sake of conciseness). The reporting of a measurement to the network may be triggered by an event (see for instance "3GPP TS 36.331 V10.4.0 (2011-12); Technical Specification; 3rd Generation Partnership Project; Technical Specification Group Radio Access Network; Evolved Universal Terrestrial Radio Access (E-UTRA); Radio Resource Control (RRC); Protocol specification, (Release 10)", section 5, and for instance section 5.5.4.4 wherein the event A3 may be such an event). In other words, in the embodiment illustrated in FIG. 3c, the network may for instance instruct a communication terminal under which conditions or at which periodicities the network wants to receive measurement reports from the communication terminal. In a sub-embodiment of this embodiment, how often the communication terminal is required to carry out measurements is then determined based on the communication terminal's configured DRX cycle. And, as soon as a triggering condition is met, the communication terminal sends the report. In this sub-embodiment, the network does not directly instruct the communication terminal how often to carry out measurements, it does so only indirectly via the configured DRX cycle.

Figure 3D:
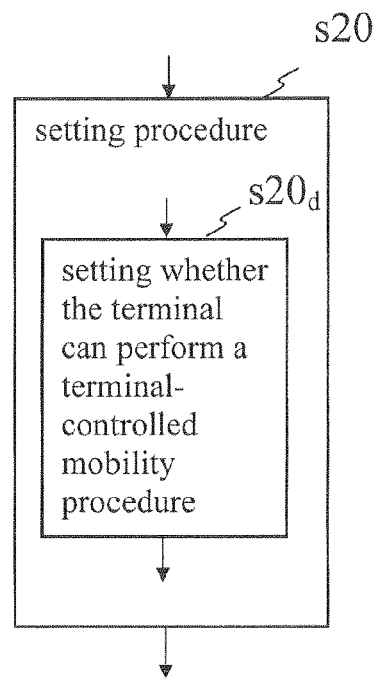

FIG. 3d is a flowchart of a setting procedure s20 in a method in one embodiment of the invention wherein the setting procedure s20 comprises setting s20$_d$, on a per communication terminal basis, whether the communication terminal is allowed to perform a terminal-controlled mobility procedure, depending on the determination s10 made by the network node (the determination procedure s10 is not illustrated on FIG. 3d for the sake of conciseness). In the embodiment illustrated by FIG. 3d, there is a specific parameter on the communication terminal indicating whether the communication terminal is allowed to rely on a terminal-controlled mobility procedure. In other embodiments however, there may be no specific (explicit) parameter set on the communication terminal allowing it to rely on a terminal-controlled mobility procedure. Instead, in these other embodiments, the communication terminal may be allowed, or prompted, to do so through the setting of other parameters. These other parameters may lead the communication terminal to initiate a terminal-controlled mobility procedure when necessary.

Above-mentioned setting steps s20$_a$-s20$_d$ involve corresponding special technical features in the sense that, in the context of a telecommunication system enabling the use of DRX cycles of different lengths, and, in accordance with a specific, potentially problematic sequence of events, when the use of a large DRX cycle is allowed (setting step s20$_a$), cell measurements and reporting are performed (setting steps s20$_b$ and s20$_c$) infrequently or not at all, leading to the communication terminal moving outside its serving cell during a DRX inactivity period while the terminal is not making any measurements. Such problems can be addressed by terminal-controlled mobility procedures, either implicitly allowed or explicitly allowed (setting step s20$_d$). Being able to control, on a per communication terminal basis, these four linked settings (setting steps s20$_a$-s20$_d$), or at least one or some of them, is advantageous. Indeed, this assists the network in avoiding that the specific sequence of events occurs, or, on the contrary, allowing it to occur.

In one embodiment, the setting procedure s20 comprises at least two of the four setting steps s20$_a$, s20$_b$, s20$_c$, and s20$_d$. In one embodiment, the setting procedure s20 comprises the setting steps s20$_a$ and s20$_c$. In one embodiment, the setting procedure s20 comprises at least three of the four setting steps s20$_a$, s20$_b$, s20$_c$, and s20$_d$. In one embodiment, the setting procedure s20 comprises all four setting steps s20$_a$, s20$_b$, s20$_c$, and s20$_d$. It is advantageous to be able, for the network, to set more than one of these four parameters since those are useful, related parameters to be adapted for the same purpose (enabling the low energy consumption of the terminal via long DRX) and especially in a context wherein small communication terminals, such as sensors, are present.

In one embodiment, the setting procedure s20 comprises setting whether the use of a large DRX cycle is allowed (setting step s20$_a$) and, if so, explicitly setting whether the communication terminal is allowed to perform a terminal-controlled mobility procedure (setting step s20$_d$). This embodiment is particularly advantageous in that the use of a large DRX cycle may be allowed for some communication terminals and, then, whether or not terminal-controlled mobility procedures are allowed is based on whether these procedures are expected to lead to some problems and whether mobility, in general, needs to be supported. In other words, the setting is made by acting on a specific link of the chain of events potentially leading to a disruptive terminal-controlled mobility procedure. In particular, in this embodiment, the setting is made "downstream", i.e. at a level more specifically focused on the direct source of the potential problem (i.e., enabling mobility in a case when the network may be too slow to control the terminal mobility by itself).

In one embodiment, the setting procedure s10 comprises setting, based on the observed or expected mobility behaviour of the communication terminal, whether the use of a large DRX cycle is allowed (setting step $s20_a$). This embodiment is particularly advantageous in that the use of a large DRX cycle is allowed or not based on whether the communication terminal is observed or expected to be a static or dynamic communication terminal. In particular, in this embodiment, the setting is made "upstream", i.e. at a level more specifically focused on the indirect source of the potential problem (the use of a large DRX cycle used by a moving communication terminal).

In one embodiment, the setting procedure s10 comprises setting, based on the observed or expected traffic and the associated quality of service (QoS) requirements, whether the use of a large DRX cycle is allowed (setting step $s20_a$). This embodiment is particularly advantageous in that the use of a large DRX cycle is allowed or not based on whether the QoS requirements can be met when relying on potentially disruptive terminal-controlled mobility procedures. In particular, in this embodiment, the setting is made "upstream", i.e. at a level more specifically focused on the indirect source of the potential problem (the use of a large DRX cycle used by a moving communication terminal).

In another embodiment, the two embodiments above are combined so that the setting procedure s10 comprises setting whether the use of a large DRX cycle is allowed based on the observed or expected mobility of the communication terminal or based on the observed or expected traffic and the associated QoS requirements.

Figure 4:
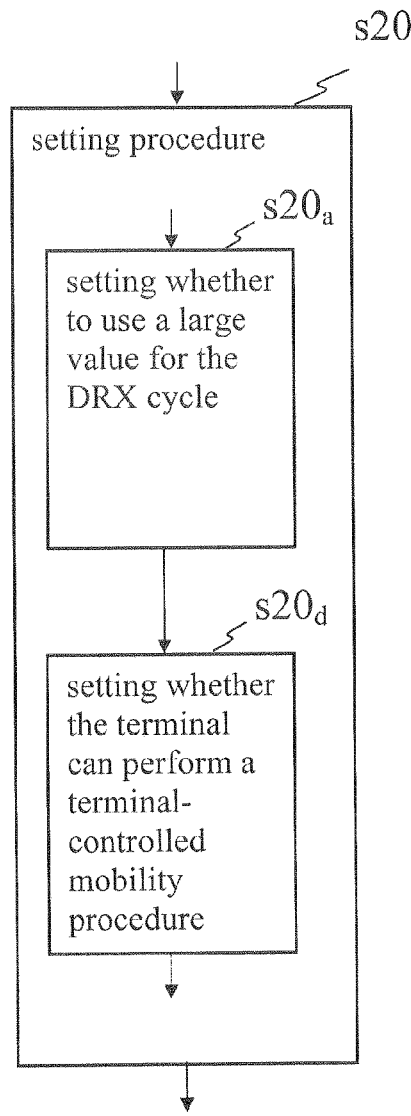
FIG. 4 is a flowchart of a setting procedure of a method in one embodiment of the invention, wherein two setting steps are performed.

FIG. 4 is a flowchart of a method in one embodiment of the invention, wherein two setting steps are performed, namely above-mentioned setting steps $s20_a$ and $s20_d$ (the determining procedure s10 is not illustrated on FIG. 4 for the sake of conciseness). Although the two setting steps are illustrated in a sequential manner, the setting steps may also be performed in another order, simultaneously, or in parallel. The second setting step may also be performed depending on the setting is carried out in the first setting step. In one embodiment, setting step $s20_d$ is performed only if the use of a large DRX cycle is allowed (in setting step $s20_a$).

Figure 5:
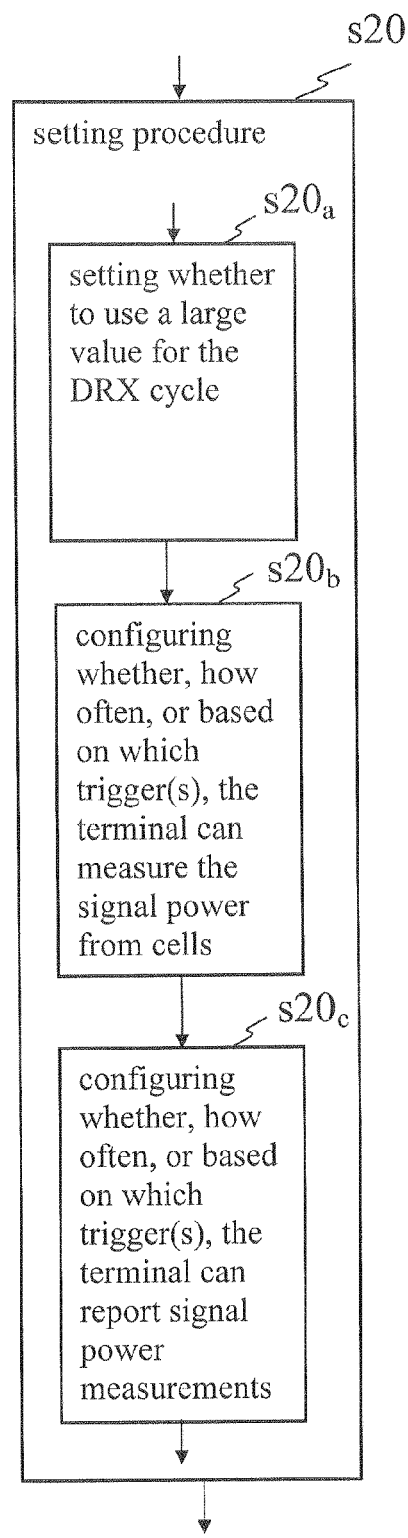
FIG. 5 is a flowchart of a setting procedure of a method in one embodiment of the invention, wherein three setting steps are performed.

FIG. 5 is a flowchart of a method in one embodiment of the invention wherein three setting steps are performed, above-mentioned setting steps $s20_a$, $s20_b$ and $s20_c$ (the determining procedure s10 is not illustrated on FIG. 5 for the sake of conciseness). Although the three setting steps are illustrated in a sequential manner, the setting steps may also be performed in another order, simultaneously, or in parallel. One or more setting steps may also be performed conditionally, i.e. depending on the setting in one or more other setting steps.

In one embodiment, when the use of a large DRX cycle is allowed (setting step $s20_a$="allowed"), the measurement and reporting are completely disabled (setting step $s20_b$="not required" and/or setting step $s20_c$="not allowed"). This is particular advantageous to reduce the power consumption of small, static communication terminals such as sensors.

In one embodiment, when the use of a large DRX cycle is allowed (setting step $s20_a$="allowed"), the measurement and reporting are still configured to be performed so that the communication terminal attempts to notify the network when detecting that a signal strength of a neighbour cell becomes stronger than that of the serving cell and thereby in principle enabling network-controlled mobility (setting step $s20_b$="required" and/or setting step $s20_c$="required"). This is particular advantageous to reduce the power consumption while still enabling network-controlled mobility as long as a communication terminal is involved in active data transmission (note that a communication terminal involved in an active data transmission session does not follow the DRX cycle but remains active).

In one embodiment, when a communication terminal is determined to be a static device, the communication terminal is then determined to be ineligible to rely on a terminal-controlled mobility (in the determining procedure s10) and a very large value for the DRX cycle is set (in the setting procedure s20). A very large value may mean, in different embodiments, at least one of: larger than 2.56 seconds, larger than 5 seconds, larger than 10 seconds, larger than 1 minute, larger than 30 minutes, and larger than 1 hour. In one embodiment, such a very large value for the DRX cycle is set exclusively for static communication terminals, and not for the other communication terminals.

In one embodiment, when a communication terminal is determined to be a static device, the communication terminal is then determined to be ineligible to rely on a terminal-controlled mobility (in the determining procedure s10) and the communication terminal is configured (in the setting procedure s20) so that it has a large DRX cycle and it does not perform any mobility procedure, but remains at a single eNodeB. If such a communication terminal would ever lose its eNB, the use of the large DRX cycle may then be disabled.

In one embodiment, the network node is a node of a radio access network (RAN). FIG. 6 (on page "6/9" of the drawings) is a flowchart of a method in one embodiment of the invention, wherein, in the determining procedure s10, the determination operation is triggered by signalling s5 from the core network (the setting procedure s20 is not illustrated on FIG. 6 for the sake of conciseness). In other words, in this embodiment, the determination operation, which is executed in the RAN, may require an explicit signalling from the core network.

In one embodiment, the determining procedure s10 further comprises: determining, on a per communication terminal basis, whether the communication terminal is eligible to rely on a radio link failure optimization, and, therefore, setting parameters on the communication terminal accordingly. In this embodiment, the radio link failure optimization may comprise fetching the communication terminal context from the communication terminal's source eNodeB and re-establishing the communication terminal's RRC connection based on that context.

Figure 7:
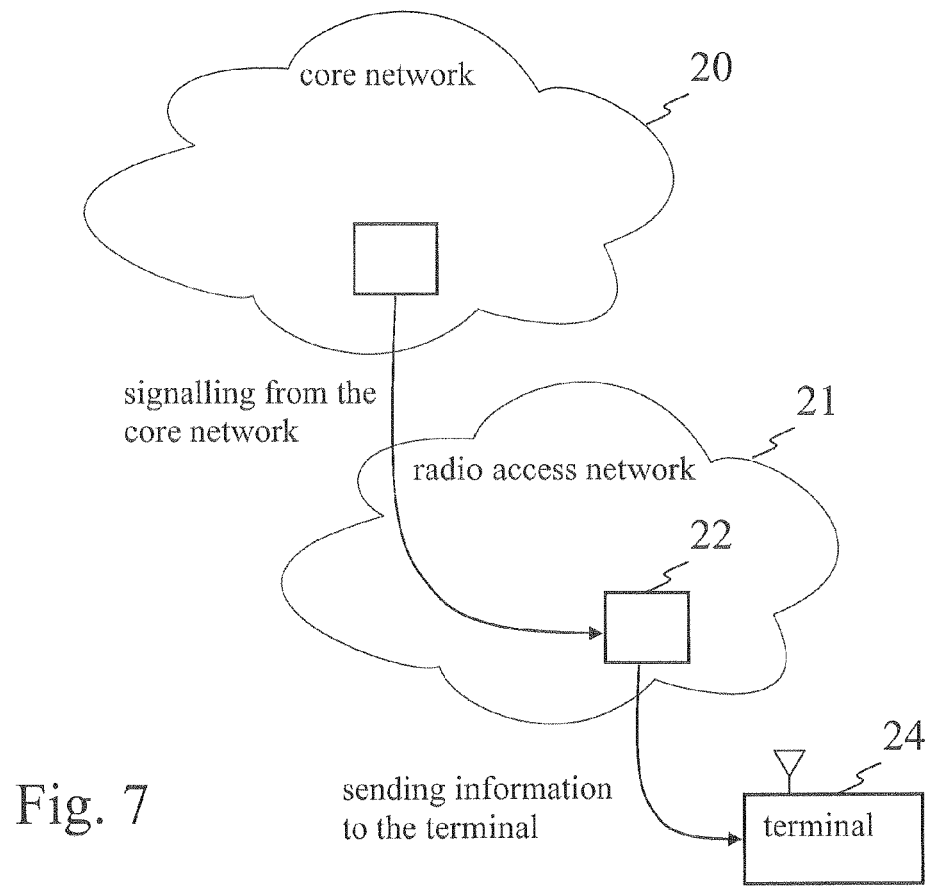
FIG. 7 is a schematic diagram illustrating a method in one embodiment of the invention, wherein signalling from a core network causes a network node of a radio access network to send information to a communication terminal.

FIG. 7 schematically illustrates a method in one embodiment of the invention, wherein a network node in a core network 20 transmits signalling to a network node 22 in a radio access network 21, which then determines whether a communication terminal 24 is eligible to rely on a terminal-controlled mobility procedure and, thereafter, sends information (such as, for example, a packet data unit or data block) to the communication terminal 24 for setting its configuration.

As mentioned above, in the determining procedure s10, determining is based on at least one characteristic of the communication terminal. In one embodiment, determining is performed based on at least one characteristic among: (1) the communication terminal's device type; (2) the communication terminal's subscription type; (3) the observed or expected traffic behaviour of the communication terminal; (4) the observed or expected speed of the communication terminal; (5) the observed or expected mobility behaviour of the communication terminal; (6) the properties of bearer(s) associated with the communication terminal; (7) the properties of bearer(s) on which data packets are currently being sent to or from the communication terminal (for instance, the network could change the configuration of a communication terminal as soon as it detects activity on a voice over IP (VoIP) bearer); (8) the observed or expected cell resource utilization of the communication terminal; and (9) the radio link failure statistics for the communication terminal. A general overview of a bearer mechanism can be found for instance in section 4.7.2 of "3GPP TS 23.401 V10.6.0 (2011-12), *Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 10)*". In relation to the above-listed criterions, the technical difference between criterion (6) and criterion (7) may be understood as follows: The bearers of (i.e., associated with) a communication terminal may be static in that their properties do not change. But the actual traffic may have a very dynamic behaviour, in that one may have packets on one bearer, and then packets on another bearer, that may trigger a change in the settings even if the bearer properties themselves do not change. Further explanations of such criterions (1)-(9) will be provided later in the description.

In one embodiment, in the determining procedure s10, determining is performed based on the observed traffic behaviour of the communication terminal. Namely, depending on the observed traffic associated with the communication terminal, the outcome of the determining operation is different.

In a sub-embodiment of this embodiment, if it is determined that a volume of traffic per unit of time associated with a communication terminal is larger than a threshold, the outcome of the determining operation is different for the communication terminal.

Further, in another sub-embodiment (which may be combined with the one mentioned in the previous paragraph), if it is determined that a volume of traffic associated with a communication terminal is smaller than a threshold for a period of time (this determination may involve determining that a timer has expired), the outcome of the determining operation is different for the communication terminal. Consequently, in the setting procedure s20, the following may for instance apply: the use of a large DRX cycle may be now allowed (change to setting s20$_a$), the communication terminal may no longer be supposed to measure the signal power from its serving cell and neighbouring cells (change to setting s20$_b$), the communication terminal may no longer be supposed to report measurements of signal power from its serving cell and neighbouring cells (change to setting s20$_c$), and/or the communication terminal may explicitly no longer be allowed to perform a terminal-controlled mobility procedure (change to setting s20$_d$). The communication terminal may also no longer be allowed to perform, or be subject to, any network-controlled mobility procedure.

In other words, the settings s20$_a$ to s20$_d$, or one or some of the settings s20$_a$ to s20$_d$, may be changed in response to an observed change in the traffic associated with the communication terminal, wherein the change may for instance be detected by a change of bearer associated with the communication terminal or by a change of volume of traffic per unit of time, relative to a threshold.

In one embodiment, if it is determined that a volume of traffic associated with a communication terminal is smaller than a threshold for a period of time (this determination may also involve detecting that a timer has expired), the communication terminal is, or may be, transitioned to a radio resource control idle state, i.e. no longer in a radio resource control (RRC) connected state.

In one embodiment, the setting procedure s10 further comprises sending information to a communication terminal 24 for which setting is performed to control the parameters of the communication terminal 24 according to the setting operation. Such embodiment is schematically illustrated in FIG. 7, although the reception of signalling from the core network 20 is an optional trigger for the setting procedure s10. The operation of network node 22 may be triggered by other causes, such as measurements performed by the radio access network. Communication terminal 24 may report its capabilities to network node 22 and the state of the communication terminal 24 may be maintained in network node 22.

During an "active time", communication terminal 24 monitors the downlink control channel, and communication terminal 24 is "not awake" when it is not monitoring the downlink control channel. The inactivity period may be of infinite duration. The inactivity period should not be confused with the inactivity timer, which is re-started each time the downlink control channel is decoded, and the inactivity timer should be of finite duration, even if the DRX cycle is of infinite length.

If the DRX cycle is infinitely long, communication terminal 24 can still send uplink data, and when it does so, the inactivity timer (of finite length) is still started and the communication terminal 24 decodes the downlink control channel and also receives downlink packets in that duration.

In one embodiment, the length of a large DRX cycle is equal to, or longer than, 2.56 seconds.

In one embodiment, the length of a large DRX cycle is at least one of: longer than 5 seconds, longer than 10 seconds, longer than 1 minute, longer than 30 minutes, and longer than 1 hour.

Figure 8:
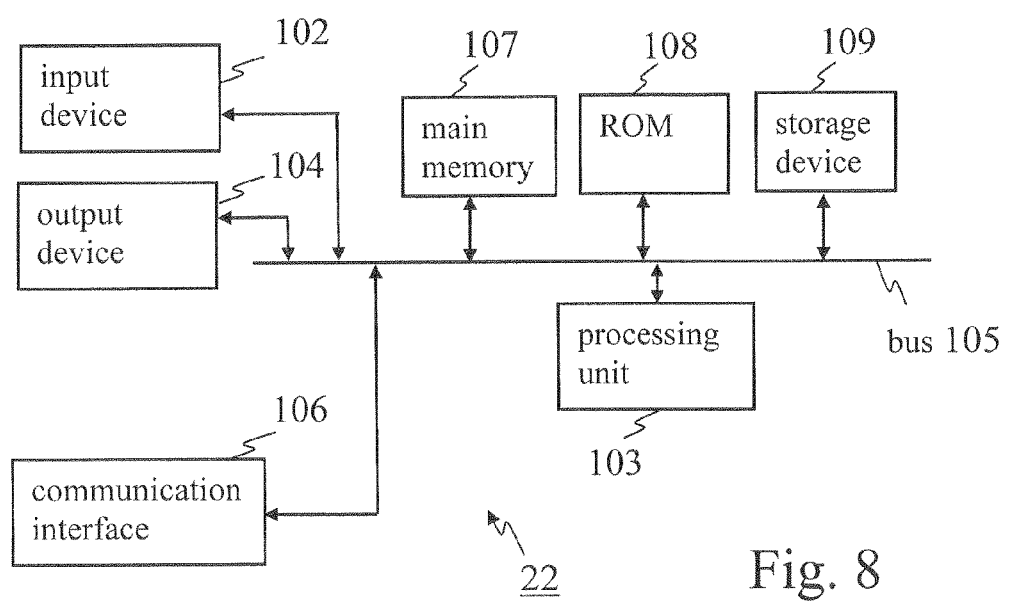
FIG. 8 schematically illustrates a possible implementation of a network node in one embodiment of the invention.

FIG. 8 is a schematic diagram of an exemplary implementation of a network node 22 usable in embodiments of the invention. As illustrated, network node 22 may include a bus 105, a processing unit 103, a main memory 107, a read-only memory (ROM) 108, a storage device 109, an input device 102, an output device 104, and a communication interface 106. Bus 105 may include a path that permits communication among the components of network node 22.

Processing unit 103 may include a processor, a microprocessor, or processing logic that may interpret and execute instructions. Main memory 107 may include a random-access memory (RAM) or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator, or more generally a user, to input information to network node 22, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables network node 22 to communicate with other devices and/or systems (such as with communication terminals). For example, communication interface 106 may include mechanisms for communicating with another device or system via a network or an air interface.

Network node 22 may perform certain operations or processes described herein. Network node 22 may perform these operations in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein. Alternatively, hardwired circuitry may be used in place of or in combination with software instructions to implement processes and/or operations described herein. Thus, implementations described herein are not limited to any specific combination of hardware and software.

FIG. 9 schematically illustrates functional units of a network node 22 configured for controlling parameters used by communication terminals of a telecommunication system, which, as discussed above, enables the use of discontinuous reception by communication terminals. Network node 22 includes a determining unit 10 configured for determining, on a per communication terminal basis and based on at least one characteristic of the communication terminal, whether the communication terminal is eligible to rely on a terminal-controlled mobility procedure. Network node 22 also includes a setting unit 20 configured for, at least for one of the possible outcomes of the determining operation performed by the determining unit 10, setting one or more parameters of the communication terminal accordingly, i.e. to reflect the determination as to whether the communication terminal is eligible to rely on a terminal-controlled mobility procedure.

Network node 22 may be a node of a radio access network. The invention is however not limited to such network node.

Network node 22 may be such that determining unit 10 is configured for carrying out the determining operation following signalling from the core network 20.

Figure 10B:
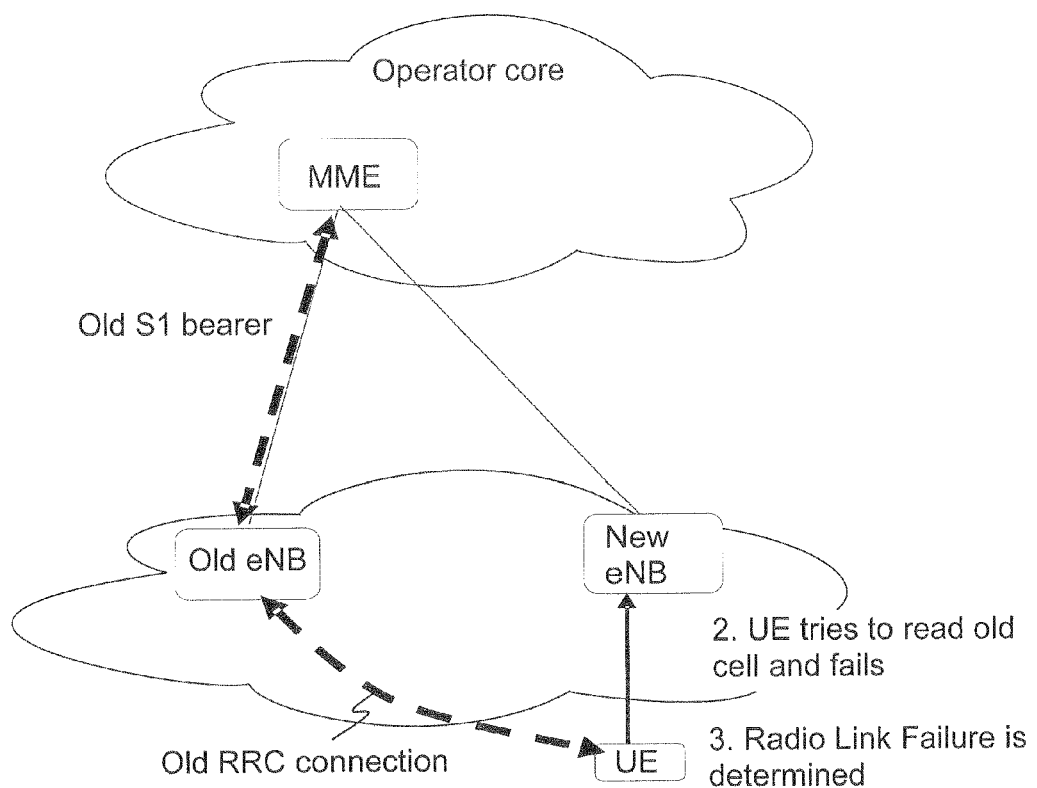
Figure 10C:
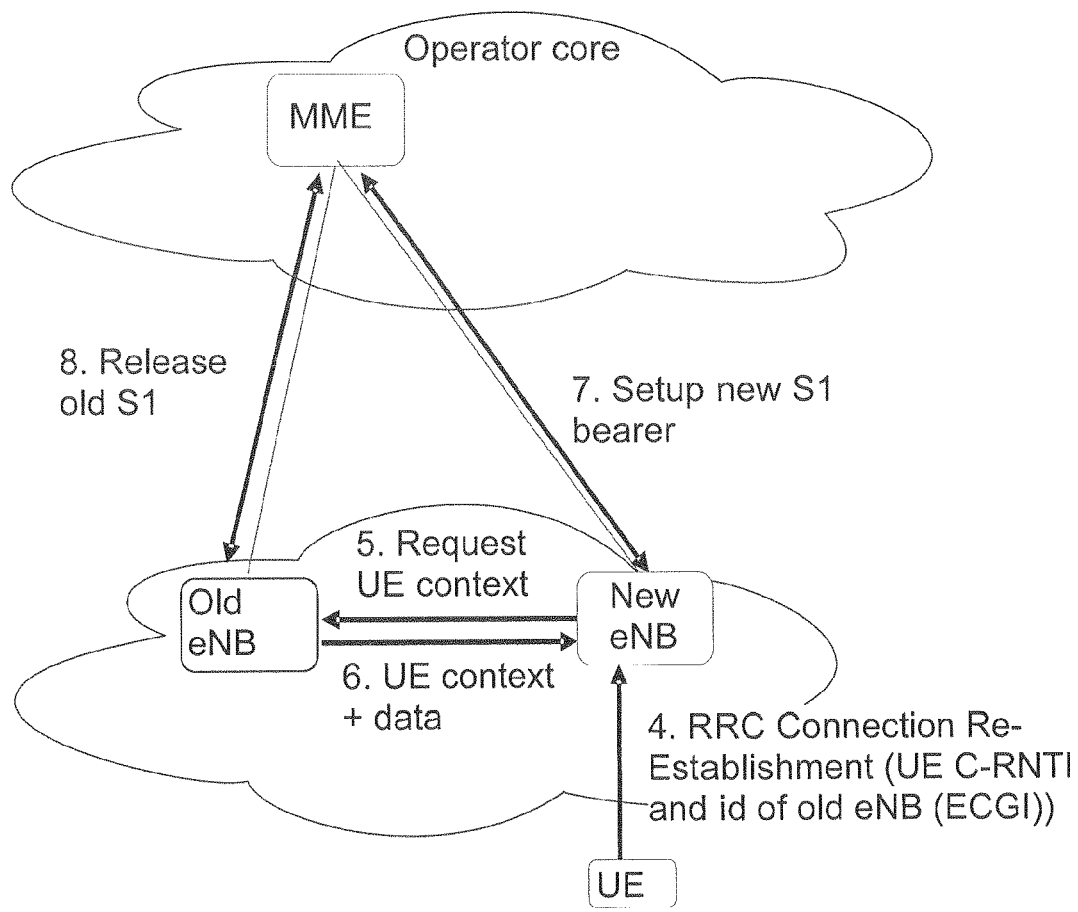

Let us now explain further, with reference to FIGS. 10*a* to 10*c*, the context in which some embodiments of the invention have been developed, and some problems that these embodiments address.

It is envisaged that, as a possible development, cellular networks may comprise a huge number of small autonomous devices, which typically, more or less infrequently (e.g. once per week to once per minute) transmit and receive only small amounts of data (or are polled for data). This kind of traffic pattern is sometimes referred to as "small data". Most of these devices are not associated with humans, but are rather sensors or actuators of different kinds, which communicate with application servers (which configure the devices and receive data from them) within or outside the cellular network. Hence, this type of communication is often referred to as machine-to-machine (M2M) communication and the devices may be denoted machine devices (MDs). Alternative terms are machine type communication (MTC) and machine type communication devices (MTC devices) (with the latter being a subset of the more general term user equipment, UE).

With the nature of MTC devices and their assumed typical uses, it follows that they are often expected to be very power efficient, since external power supplies may not be available and since frequently replacing or recharging their batteries is neither practically nor economically feasible. Some of these devices may even have no battery, and be powered by other energy sources (such as e.g. solar, heat sources, etc.), so that it is very important to reduce their power consumption.

One possible means to achieve low energy consumption in MTC devices is to use long active/connected mode DRX cycles. This allows the MTC devices to remain connected to the eNB and still spend most of their time in an energy-efficient sleep mode. An advantage that connected mode DRX has over idle mode (paging) DRX is that the MTC device does not have to go through idle-to-connected mode transition before transmitting or receiving data. This saves signalling overhead and thus both radio resources and battery lifetime.

Existing system procedures may allow for connected mode DRX periods of up to 2.56 seconds. While this may significantly reduce the energy consumption, energy-limited machine devices may benefit from even longer periods of connected mode DRX. New DRX modes may be advantageously defined with longer periods, such as DRX cycle lengths of several minutes.

Increasing the DRX cycle length has the consequence that it takes more time to deliver a downlink packet to the communication terminal. For many machine device applications such as sensors, this may be a reasonable compromise for the sake of lower power consumption. In the extreme case, it may be possible to set the DRX cycle length to infinity, meaning that there is no pre-scheduled time to deliver downlink packets. However, it is still possible for the communication terminal to send uplink traffic. Also, it is possible to let the communication terminal listen to downlink allocations shortly after an uplink transmission. In this way, downlink traffic can still be delivered to the communication terminal after an uplink transmission in case the DRX cycle length is long or even infinite. This requires that the eNB buffers a downlink packet until the communication terminal polls for it.

For reduced power consumption, the communication terminal's measurement reporting also needs to be considered. The eNB configures the RRC connected communication terminal to perform radio resource management (RRM) measurements. When a trigger condition is fulfilled, the communication terminal sends a measurement report to its serving eNB. The periodicity at which the communication terminal has to measure its serving cell and neighbour cells increases with increasing DRX cycle. Configuring a longer DRX cycle and thus a longer measurement interval also helps to further reduce power consumption.

Long DRX cycles bear a risk however that the communication terminal moves out of the cell before detecting it or at least too late to send a measurement report or complete the handover. This results in a radio link failure (RLF), which is not desirable. Thus, depending on the speed at which the communication terminal moves, performing measurements with a very long interval may not be sufficient to support handover decisions.

RLF can be extended with so-called mobility robustness optimization (MRO) which provides the network with more detailed information about the radio link failure such as "failedPCellId", "previousPCellId", "locationCoordinates" and "timeConnFailure". This additional information is intended to allow the network (source cell's eNB) to optimize the handover e.g. by adjusting parameters. However, as shown in FIG. 10c below, the eNB of the cell to which the communication terminal connects after the RLF could use this information also to request the communication terminal's context from the source eNB. This context may comprise the communication terminal's configuration (RRC configuration, security configuration . . . ) but also user data that was pending in the source eNB.

Nevertheless, it is not desirable that many devices undergo RLF or that they perform autonomous (terminal-controlled) handover. The latter takes the possibility from the network to control which communication terminal performs a handover to which cell and frequency layer and therefore limits the possibilities to perform radio resource management.

FIG. 10a schematically illustrates a communication terminal (UE) moving when in a state "RRC_CONNECTED" and when not monitoring the downlink control channel (i.e., during DRX off). FIG. 10b schematically illustrates a RLF after communication terminal (UE) moved when in a state "RRC_CONNECTED". FIG. 10c schematically illustrates an optimized mobility robustness optimization to recover from a radio link failure (RLF). Ways to address the problems associated with such a scenario will now be explained in more detail.

One option is therefore to limit the use of large DRX cycles to static or slowly moving terminals, such that for slowly moving communication terminals either long measurement intervals are configured, or no measurements are taken at all and consequently network-controlled handovers are not supported.

With the enhancements illustrated with reference to FIG. 10c (optimized mobility robustness optimization, or optimized MRO), it is possible to recover more quickly from RLF events, e.g. by fetching the UE context from the old eNB. This can basically be exploited in a terminal-controlled mobility mechanism, in which communication terminals autonomously determine to what radio cells to connect and relying on MRO to make the re-connection smooth. However, from a network perspective, it is not desirable that many communication terminals select target cells autonomously, since e.g. controlled load management between cells and steering of communication terminals to RAT/frequency layers is thereby prohibited.

Therefore, it is desirable that the usage of terminal-controlled mobility based on MRO is controlled such that only communication terminals which particularly benefit from this (e.g. machine devices) can make use of this and only to the extent that the control of efficient network usage is not challenged.

The use of terminal-controlled mobility in itself is known in the art, i.e., it is used in idle mode LTE, or also for URA_PCH in 3G. The difference here compared to existing techniques is that some embodiments of the invention selectively apply terminal-controlled mobility for specific communication terminals, for example based on their low traffic pattern and possibly based on their expected mobility behaviour. It is determined in the network whether the given communication terminal is eligible for the terminal-controlled mobility.

Therefore, it has been notably recognized that the use of long DRX parameters as well as special measurement reporting and mobility settings should be applied together with proper network control, allowing these schemes to be limited to the cases when they are expected to be beneficial for the type of communication terminal in use. While a certain set of communication terminals, i.e., the machine devices, may benefit from the optimizations mentioned above, the use of long DRX settings is not useful for other communication terminals. If long DRX setting is applied in the wrong case, it may result in too high delay and low throughput for downlink traffic, improper mobility support leading to many radio link failures, which in turn cause excessive network signalling, packet drops, high energy consumption, and consequently bad quality of experience for the user.

It may be possible to base the DRX usage on communication terminal's specific parameters such as subscriber profile ID. However, such a simple control mechanism does not consider that different types of traffic (which can be differentiated by the bearers) may have different requirements and hence the DRX settings would need to be adapted to the type of traffic. Additionally, other parameters such as the terminal measurement configuration also need to be adapted in line with the change of the DRX settings.

In one embodiment, the type of control should be such as to enable a mixture of "small data" and "large data" traffic for a single communication terminal, so that the long DRX setting and related special measurement reporting and mobility settings are applied for "small data" only. "Small data" refers to sensor/actuator low volume traffic consisting of infrequent bursts of a limited number of packets; "large data" refers to regular/occasional high volume traffic. Such occasional or exceptional high volume traffic could be e.g., the download of new software, or the upload of log files. There are no current mechanisms to allow for the change of the DRX settings and related measurement reporting and mobility parameters to be changed depending on whether "small data" or "large data" traffic is being carried in the air interface.

Therefore, in one embodiment of the invention, a network policy control is used where the core network may provide policy rules to allow or disallow the use of long DRX setting and related parameters, as well as the usage of enhanced terminal-controlled mobility (i.e., UE-controlled mobility) when being RRC_CONNECTED state.

The use of the special parameter settings and usage of enhanced terminal-controlled mobility may therefore be, in one embodiment, switched on and off, on demand. In one embodiment, a new sub-state within RRC_CONNECTED is applied when the long DRX setting and related parameters are used, which takes effect when the communication terminal has small data traffic. Whenever large data traffic is detected, the regular DRX and related parameter settings are restored. In other embodiments, the use of special parameter settings and usage of enhanced terminal-controlled mobility are dependent on other factors such as the rate of RLF events/signalling, the resource utilization in the radio cell, terminal velocity, or traffic pattern estimates.

The RRC connected mode long DRX approach requires special treatment in the eNB, and it should be ensured that only the communication terminals that are eligible for the optimization are allowed to get this treatment, as controlled by the network operator. Thus, there is a need for policy control on this feature. In one embodiment, the core network sends signalling, to allow or disallow the use of long DRX and related parameters, or terminal-controlled mobility with optional context fetching, based on subscription and/or device type.

There is a difference in how the parameters may be set for the two types of traffic. As an example, the following parameters may be applied. As it can be seen for Table 1 below, other parameters than those mentioned above (setting steps (a) to (d)) may be set on a per communication terminal basis.

TABLE 1

Example of parameters applied on a per communication terminal basis.

| | Sensor/actuator with low volume traffic | Sensor/actuator with occasional high volume traffic |
|---|---|---|
| DRX cycle (setting step s20$_a$) | Very long | Medium or short |
| On-duration timer | Short | Medium |
| Inactivity timer | Short | Medium |
| Short-DRX cycle | No | Possible |
| Terminal measurements (setting step s20$_b$) | Very infrequent or none | Yes |
| Measurement reporting (setting step s20$_c$) | No | Yes |
| Mobility (setting step s20$_d$) | Terminal controlled or none | Network controlled |
| Connected to idle timeout | Very long | Very long |

In one embodiment, the communication terminal's treatment in the eNB is dependent on whether it has "small data" or "large data", i.e., sensor/actuator low volume traffic, or regular/occasional high volume traffic. When a communication terminal has overwhelmingly only one type of data, the core network may set the proper settings based on subscription and/or device type, and signal the setting to the RAN nodes (see FIG. 7).

For certain communication terminals having both small data and large data, a simple on/off type of control for long DRX setting which would just allow or disallow a long DRX and special mobility handling may not be sufficient. One may want to allow two types of traffic for a single communication terminal, i.e. allow both the sensor/actuator type of traffic (infrequent, low volume), as well as an occasional burst of higher volume traffic for e.g. software download or measurement data uploading. In one embodiment, the two types are differentiated in separate bearers with different quality of service (QoS) class identifiers (QCIs). In another embodiment, the QCI or some other parameter of a single bearer is changed. In one embodiment, the traffic is differentiated within a single bearer, for instance using the service class identifier.

In some embodiments of the invention, differentiated treatment of communication terminals and/or bearers is provided within the RRC_CONNECTED state. Other embodiments provide for the existence of RRC_CONNECTED sub-states. One such embodiment will now be described with reference to FIG. 11.

Figure 11:
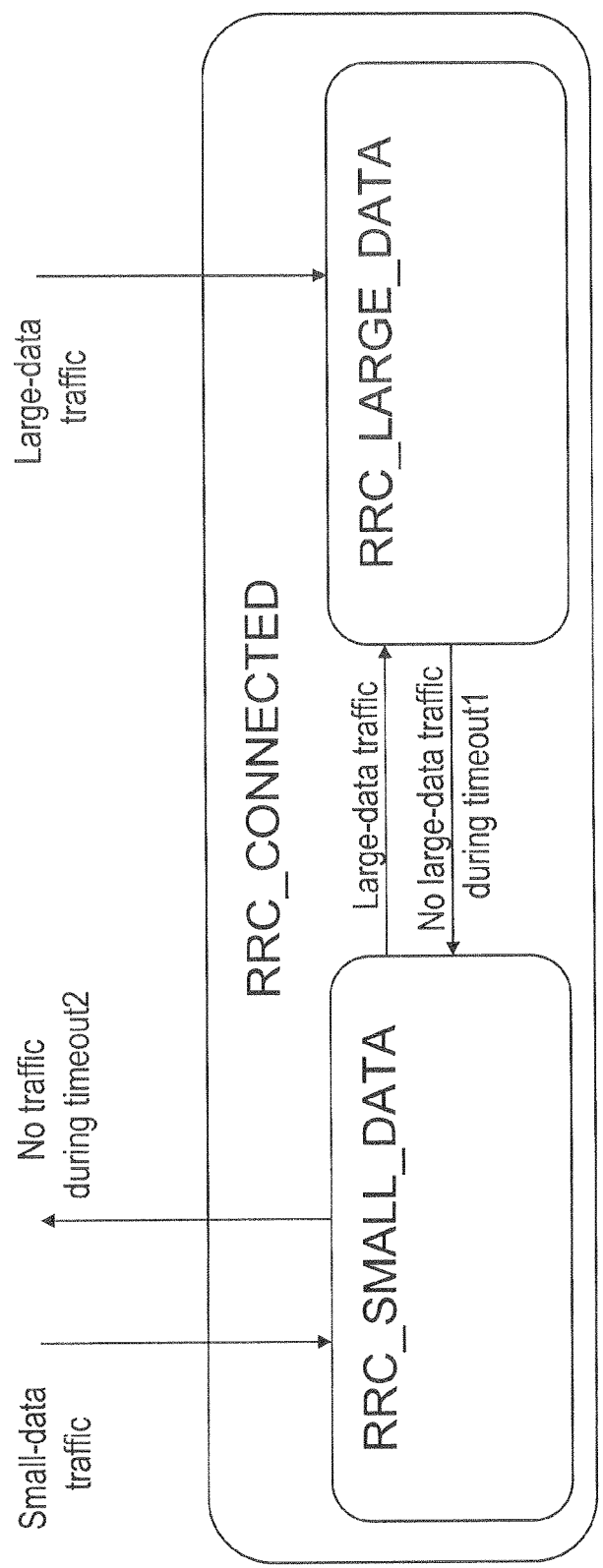
FIG. 11 is a state diagram applicable to a method and/or network node in one embodiment of the invention.

In one embodiment, to manage the two types of communication terminal handling, two sub-states are introduced within RRC_CONNECTED. The sub-state "RRC_SMALL_DATA" refers to the communication terminal treatment optimized for sensor/actuator low volume traffic, while the sub-state "RRC_LARGE_DATA" refers to the case when the communication terminal is in RRC_CONNECTED state but the optimizations are not applied. FIG. 11 schematically illustrates the two sub-states as well the state transitions which are detailed below.

If there is any "large data" traffic, then the communication terminal is immediately moved to the RRC_LARGE_DATA sub-state, so that the large volume data transfer can be served appropriately, with short delay. The communication terminal is also moved to RRC_LARGE_DATA in case there is any indication that large data is to arrive, e.g., due to a change in a bearer's properties indicating large data instead of small data.

The eNB maintains a timer in RRC_LARGE_DATA sub-state since the last "large data" packet. When this timer reaches a timeout (referred to as "timeout1"), the sub-state can change to RRC_SMALL_DATA. This timeout may be identical to a connected-to-idle timeout, or take a different value. This timer ensures that if there is no large data traffic, the optimizations for small data are used.

The eNB also maintains a timer in RRC_SMALL_DATA sub-state since the last "small data" packet. When this timer reaches a timeout (referred to as "timeout2"), the eNB may request the mobility management entity (MME) to transition the communication terminal to idle mode. The value of timeout2 could be set to a high value, to facilitate communication terminals that stay in RRC_SMALL_DATA sub-state for a long time. In the extreme, timeout2 could be set to infinity.

However, it may be possible to set timeout2 to a lower value in certain cases. This may be useful to allow a more speedy transition to idle mode, so that mobility in idle mode can be performed, when connected mode mobility with the long DRX settings is not efficient or not used.

When the communication terminal is initially idle and then becomes RRC_CONNECTED, the communication terminal moves to RRC_SMALL_DATA or RRC_LARGE_DATA sub-state depending on the type of traffic that the communication terminal has. The type of traffic could be known based on explicit RRC signalling from the communication terminal in the message carrying a non-access stratum (NAS) service request in the case of uplink traffic, and based on explicit signalling in the downlink data notification message from the serving gateway (SGW) to the MME in case of downlink traffic, where this information could be extracted from the bearer that a new packet comes on, or explicit indication of the type of traffic in the form of e.g., Diffserv codepoint or via the use of service class identifier, in case the two types of traffic are differentiated within a single bearer.

In case such an indication is not available, when a communication terminal enters RRC_CONNECTED state, the communication terminal may initially be allocated sufficient resources to be able to send uplink or downlink packets. Then, based on the properties that the initial packet (or initial few packets) is sent on, the communication terminal is immediately moved to either RRC_LARGE_

DATA sub-state if there is any packet on a large data bearer, or to RRC_SMALL_DATA sub-state, if all data flows on a small data bearer.

In one embodiment, the eNB stores a set of parameters related to RRC_SMALL_DATA sub-state, including:
- Whether RRC_SMALL_DATA is applicable to the given communication terminal or not based on operator policy.
- The current sub-state, i.e., is the communication terminal in RRC_SMALL_DATA or not.
- The DRX parameters.
- The measurement configuration and reporting parameters.
- The values of timeout1 and timeout2.
- The mobility mode to be applied, i.e., whether handover is applied, whether terminal-controlled mobility is allowed.

These parameters (or an index to these parameters) may be downloaded from the core network to the eNB when applicable. These parameters may also be transferred from one eNB to another during a mobility event as part of the UE context in case mobility is supported.

It may be that communication terminals may autonomously want to make use of a terminal-controlled mobility procedure as illustrated for instance in FIGS. 10a to 10c. The network should set parameters to prohibit such misuse if it risks affecting network stability and utilization. An example for an eNB to enforce the policy about the permission to use terminal-controlled mobility is by validating after step 4 in FIG. 10c if the device is entitled to terminal-controlled mobility (based on subscription, device type, bearer type, traffic pattern, etc.) and executing steps 5-6 only if it is considered permissible.

More fine grained policy control is also possible. For example, in some embodiments, the DRX setting, terminal measurement configuration and/or mobility mode selection may depend on further aspects, such as:
- The rate of RLF events or RLC signalling occurring, or the percentage of RLF per connected communication terminal. For instance, if the number of RLF events is large (resulting in significant signalling), the DRX setting is set shorter (for instance to the use of a small DRX cycle), communication terminals are moved to IDLE state and/or terminal-controlled mobility in RRC_CONNECTED is disabled.
- Resource utilization in the radio cell. For instance, if the total load in the cell and possibly surrounding cells is exceeding a threshold, terminal-controlled mobility in RRC_CONNECTED is restricted.
- The speed at which the communication terminal moves. Performing measurements with a very long interval may not be sufficient to support handover decisions and DRX timers are reduced.
- Traffic pattern estimates. For instance, if the traffic activity intervals are expected to be much longer than DRX timer settings, the communication terminal is moved to RRC IDLE.

Some embodiments of the invention have therefore the following advantages.

The network is allowed to control when long DRX settings, terminal measurement and other parameters can be applied, allows its use only when needed. This avoids the use of long DRX settings when it would cause too high delay and low throughput for downlink traffic, or improper mobility support leading to many radio link failures, which in turn cause excessive network signalling, packet drops, high energy consumption, and consequently bad quality of experience for the user. On the other hand, the use of long DRX settings for machine devices may be enabled, reducing energy consumption to very low levels.

In one embodiment using a RRC_SMALL_DATA sub-state and a RRC_LARGE_DATA sub-state, the use of the RRC_SMALL_DATA sub-state allows communication terminals to take advantage of the optimizations for small data including long DRX setting, reduced measurement reporting, and/or terminal controlled mobility with optional context fetching even if the terminal has a mixture of small data and large data. Fine grained policies for switching on terminal controlled mobility helps to focus this optimization to the cases when it is most needed.

In one embodiment, the network node is an eNB, which determines policy for a communication terminal based on some input options. The policy can apply for DRX settings, measurement parameters, timeout parameters, and whether to use terminal-controlled mobility procedures or not. The input may be for instance core network signalling, traffic behaviour, RLF statistics, cell resource utilization, or terminal speed. The eNB may enforce this policy by configuring the communication terminals accordingly and by possibly blocking terminal-controlled mobility procedures.

In one embodiment, a communication terminal may receive policy from network in the form of configuration parameters, and may determine whether to use terminal-controlled mobility or not (and possibly some DRX configurations).

Where the term "determining unit" and "setting unit" are used herewith, no restriction is made regarding how distributed this element may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, the above-mentioned and/or claimed determining unit and setting unit are replaced by determining means and setting means respectively for performing the functions of the determining unit and setting unit.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method, carried out by a network node, for controlling parameters used by communication terminals of a telecommunication system, the telecommunication system enabling the use of discontinuous reception by communication terminals, wherein
the use of discontinuous reception by a communication terminal involves DRX cycles, during each one of which a communication terminal is arranged to wake up at least once to monitor a downlink control channel; and the telecommunication system enables the use of DRX cycles of different lengths;

the method comprising:

a determining procedure, comprising determining, by the network node, on a per communication terminal basis, whether the communication terminal is eligible to rely on a terminal-controlled mobility procedure, wherein determining is based on at least one characteristic of the communication terminal; and a setting procedure, comprising setting, by the network node, at least for one of the possible outcomes of the determining procedure, setting one or more parameters on the communication terminal accordingly.

2. The method of claim 1, wherein, in the setting procedure, the step of setting one or more parameters on the communication terminal comprises at least one of:
(a) setting whether to use a large value for the DRX cycle, wherein the telecommunication system enables at least the use of a DRX cycle with a first length and the use of a DRX cycle with a second length, the first length is shorter than the second length;
(b) configuring whether, how often, or based on which trigger(s), the communication terminal is supposed to measure the signal power from its serving cell and neighbouring cells; and
(c) configuring whether, how often, or based on which trigger(s), the communication terminal is supposed to report measurements of signal power from its serving cell and neighbouring cells.

3. The method of claim 2, wherein the second value for the DRX cycle is equal to, or larger than, 2.56 seconds.

4. The method of claim 3, wherein the second value for the DRX cycle is at least one of: larger than 5 seconds, larger than 10 seconds, larger than 1 minute, larger than 30 minutes, and larger than 1 hour.

5. The method according to claim 1, wherein the determining procedure further comprises:
determining, on a per communication terminal basis, whether the communication terminal is eligible to rely on a radio link failure optimization.

6. The method of claim 5, wherein the radio link failure optimization comprises fetching the communication terminal context from the communication terminal's source eNodeB and re-establishing the communication terminal's radio resource control connection based on that context.

7. The method according to claim 1, wherein the network node is a node of a radio access network.

8. The method of claim 7, wherein, in the determining procedure, determining is triggered by signalling from the core network.

9. The method according to claim 1, wherein the at least one characteristic of the communication terminal used in the determining procedure comprises at least one of:
(1) the communication terminal's device type;
(2) the communication terminal's subscription type;
(3) the observed or expected traffic behaviour of the communication terminal;
(4) the observed or expected speed of the communication terminal;
(5) the observed or expected mobility behaviour of the communication terminal;
(6) the properties of bearer(s) associated with the communication terminal;
(7) the properties of bearer(s) on which data packets are currently being sent to or from the communication terminal;
(8) the observed or expected cell resource utilization of the communication terminal; and
(9) the radio link failure statistics for the communication terminal.

10. The method according to claim 1, wherein the setting procedure comprises sending information to the communication terminal to set thereon the one or more parameters in such a manner that the communication terminal is configured to rely on a terminal-controlled mobility procedure when necessary.

11. The method according to claim 1, wherein
the determining procedure comprises maintaining a RRC_SMALL_DATA state, and a RRC_LARGE_DATA state, on a per communication terminal basis; and
the RRC_SMALL_DATA state and the RRC_LARGE_DATA state involve differently determining, on a per communication terminal basis, whether the communication terminal is eligible to rely on a terminal-controlled mobility procedure.

12. The method of claim 11, wherein the determining procedure comprises:
determining that a volume of traffic, per unit of time, associated with a communication terminal in RRC_SMALL_DATA state is larger than a threshold; and
transitioning the communication terminal from the RRC_SMALL_DATA state to the RRC_LARGE_DATA state.

13. The method of claim 11, wherein the determining procedure comprises:
determining that a volume of traffic associated with a communication terminal in RRC_LARGE_DATA state is smaller than a threshold for a period of time; and
transitioning the communication terminal from the RRC_LARGE_DATA state to the RRC_SMALL_DATA state.

14. The method of claim 13, wherein determining that a volume of traffic associated with a communication terminal in RRC_LARGE_DATA state is smaller than a threshold for a period of time comprises determining that a timer has expired.

15. The method according to claim 11, wherein the RRC_SMALL_DATA state and the RRC_LARGE_DATA state are sub-states of a radio resource control connected, RRC_CONNECTED state.

16. The method of claim 15, further comprising:
determining that a volume of traffic associated with a communication terminal in RRC_SMALL_DATA state is smaller than a threshold for a period of time; and
transitioning the communication terminal, or sending a request to another network node to cause the communication terminal to transition, from the RRC_CONNECTED state to a radio resource control idle state.

17. The method of claim 16, wherein determining that a volume of traffic associated with a communication terminal in RRC_SMALL_DATA state is smaller than a threshold for a period of time comprises determining that a timer has expired.

18. The method according to claim 11, wherein the setting procedure comprises setting, for a communication terminal in RRC_SMALL_DATA state, the second value for the DRX cycle.

19. The method according to claim 11, wherein the setting procedure comprises setting, for a communication terminal in RRC_SMALL_DATA state, that the communication terminal is not supposed to measure the signal power from its serving cell and neighbouring cells.

20. The method according to claim 11, wherein the setting procedure comprises setting, for a communication terminal in RRC_SMALL_DATA state, that the communication terminal is not supposed to report measurements of signal power from its serving cell and neighbouring cells.

21. The method according to claim 11, wherein the determining procedure comprises determining, for a communication terminal in RRC_SMALL_DATA state, that the communication terminal is eligible to rely on a terminal-controlled mobility procedure.

22. The method according to claim 11, wherein the determining procedure comprises:
  determining that a change in the properties of the bearer(s) associated with a communication terminal occurred, wherein the change indicates a change or potential change in the type of traffic associated with a communication terminal; and
  transitioning the communication terminal from the RRC_SMALL_DATA state to the RRC_LARGE_DATA state, or from the RRC_LARGE_DATA state to the RRC_SMALL_DATA state.

23. A computer program product comprising a non-transitory computer readable medium storing program code for performing the steps of claim 1 when the computer program product is executed on a computing device.

24. A network node configured for controlling parameters used by communication terminals of a telecommunication system, the telecommunication system enabling the use of discontinuous reception by communication terminals, wherein
  the use of discontinuous reception by a communication terminal involves DRX cycles, during each one of which a communication terminal is arranged to wake up at least once to monitor a downlink control channel; and
  the telecommunication system enables the use of DRX cycles of different lengths;
    the network node comprising:
      a memory; and
      a processor, wherein the processor is configured to:
        determine, on a per communication terminal basis, whether a communication terminal is eligible to rely on a terminal-controlled mobility procedure, wherein determining is based on at least one characteristic of the communication terminal; and
        at least for one of the possible outcomes of the determining operation, one or more parameters on the communication terminal accordingly.

25. The network node of claim 24, the network node being a node of a radio access network.

26. The network node of claim 25, wherein the processor is configured for carrying out the determining operation following signaling from the core network.

* * * * *

UNITED STATES PATENT AND TRADEMARK OFFICE
CERTIFICATE OF CORRECTION

PATENT NO. : 9,439,236 B2  
APPLICATION NO. : 14/398699  
DATED : September 6, 2016  
INVENTOR(S) : Miklós et al.

Page 1 of 1

It is certified that error appears in the above-identified patent and that said Letters Patent is hereby corrected as shown below:

On the Title Page

Item (75), under "Inventors", in Column 1, Line 1, delete "Pilisborosjenö (HU);" and insert -- Pilisborosjenő (HU); --, therefor.

In the Specification

In Column 5, Line 24, delete "illustrated on" and insert -- illustrated in --, therefor.

In Column 5, Line 44, delete "illustrated on" and insert -- illustrated in --, therefor.

In Column 5, Line 54, delete "illustrated on" and insert -- illustrated in --, therefor.

In Column 6, Line 16, delete "illustrated on" and insert -- illustrated in --, therefor.

In Column 7, Line 46, delete "illustrated on" and insert -- illustrated in --, therefor.

In Column 7, Line 57, delete "illustrated on" and insert -- illustrated in --, therefor.

In Column 8, Line 48, delete "illustrated on" and insert -- illustrated in --, therefor.

In Column 11, Line 37, delete "main memory 109" and insert -- main memory 107 --, therefor.

In Column 11, Line 55, delete "setting unit 20" and insert -- setting unit 12 --, therefor.

In Column 16, Line 58, delete "Diffsery codepoint" and insert -- DiffServ codepoint --, therefor.

In Column 17, Line 57, delete "RRC IDLE." and insert -- RRC_IDLE. --, therefor.

Signed and Sealed this  
First Day of September, 2020

Andrei Iancu  
*Director of the United States Patent and Trademark Office*